United States Patent [19]

Pandolfi

[11] Patent Number: 4,757,753

[45] Date of Patent: Jul. 19, 1988

[54] ESPRESSO COFFEE MACHINE

[75] Inventor: Alberto Pandolfi, Milan, Italy

[73] Assignee: Brevetti Gaggia S.p.A., Milan, Italy

[21] Appl. No.: 11,745

[22] Filed: Feb. 6, 1987

[30] Foreign Application Priority Data

Mar. 10, 1986 [IT] Italy ............................. 53091/86[U]

[51] Int. Cl.⁴ ............................................ A47J 31/40
[52] U.S. Cl. ........................................ 99/290; 99/293; 99/302 R
[58] Field of Search ................. 99/294, 293, 284, 290, 99/291, 295, 300, 302 R, 302 P, 307, 279; 426/433

[56] References Cited

U.S. PATENT DOCUMENTS

| | | | |
|---|---|---|---|
| 2,152,410 | 3/1939 | Illy | 99/290 |
| 3,122,987 | 3/1964 | Ruhnke | 99/290 |
| 3,824,914 | 7/1974 | Casiano | 99/302 R |
| 4,551,611 | 11/1985 | Longo | 99/293 |
| 4,644,856 | 2/1987 | Borgmann | 99/294 |

FOREIGN PATENT DOCUMENTS 1454199 12/1968 Fed. Rep. of Germany ........ 99/300

Primary Examiner—Robert W. Jenkins
Attorney, Agent, or Firm—Miller & Gibbons

[57] ABSTRACT

The present specification discloses an improved type of "Espresso" coffee machine where the means (22) for the production and distribution of hot water and steam are independent from the means (5) used for the production of the espresso coffee itself.

In this way the construction of the "espresso" coffee machines is very simplified and is possible to easily assemble various type of machines to meet whatever customer's requirements.

5 Claims, 3 Drawing Sheets

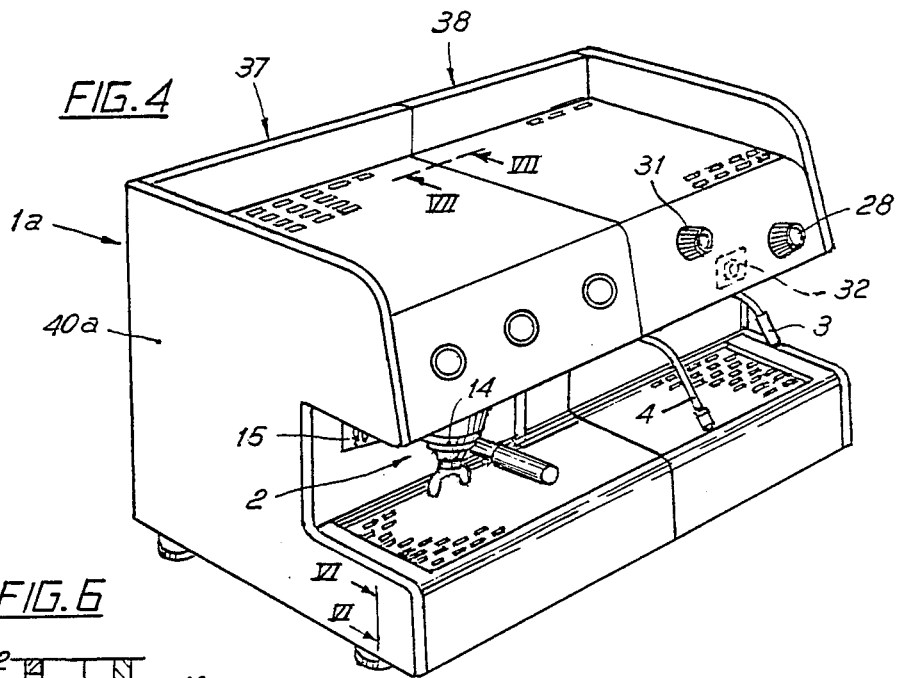
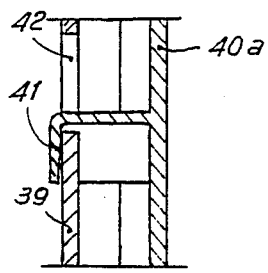
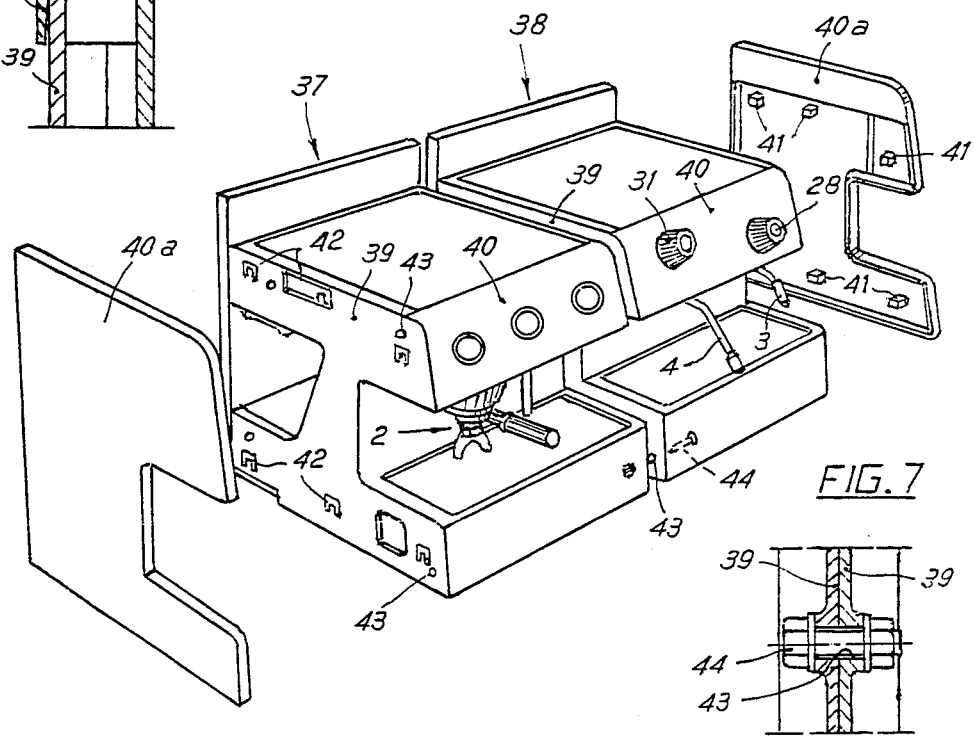

ESPRESSO COFFEE MACHINE

This patent relates to Espresso Coffee Machines for use in public coffee-houses; the machines are of the type which also comprises means for the separate production and distribution of hot water and steam for other uses, for example hot water for the preparation of tea and similar drinks and steam for heating other drinks such as milk and white coffee.

In the known machines of this type, a boiler containing a heat exchanger is used, said boiler being fed under pressure by means of a water pump for production of the espresso coffee.

The hot water and the steam for other uses are instead drawn directly from the boiler and fed to associated conveying tubes governed by control valves.

Depending on use requirements, the machines are provided with one or more sets of distribution for the espresso coffee (generally from 1 to 4) and with a corresponding number of different distributing tubes for the bot water and steam.

The capacity of the boiler must however be determined as a function of the sets of coffee distributors, and this makes complicated and expensive the fabrication of the different types of machines, necessary to meet market requirements, in that it involves also the use of interconnecting tubes between the various parts of the machine which differ depending on the machine type.

The aim of the present invention is to obviate said drawbacks, and its object is an espresso coffee machine of the type above specified the main feature of which lies in the fact that it comprises means for the production and distribution of hot water and steam independently from the production of the espresso coffee itself.

Further characteristics and advantages of the invention will be clear from the following description having reference to the annexed drawings, which are given by way of example only, and are not limitative.

In the drawings:

FIG. 4 is a view similar to FIG. 1 of a machine according to a variant of the invention.

FIG. 5 is an exploded view of FIG. 4, and

FIGS. 6 and 7 are transversal cross sections taken respectively on lines VI—VI and VII—VII of FIG. 4.

Figure 1:
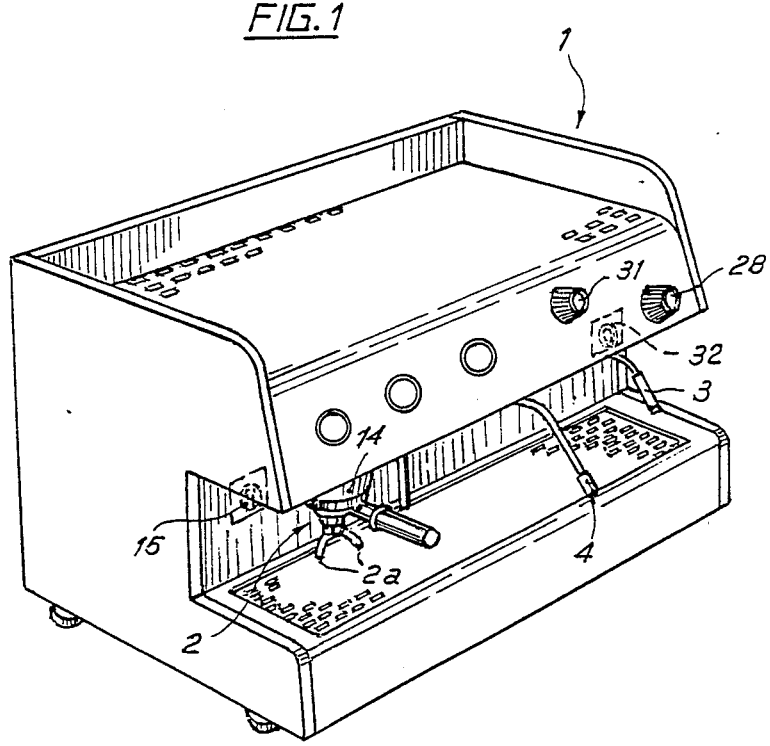
FIG. 1 is a perspective view of the espresso coffee machine according to the invention.
Figure 2:
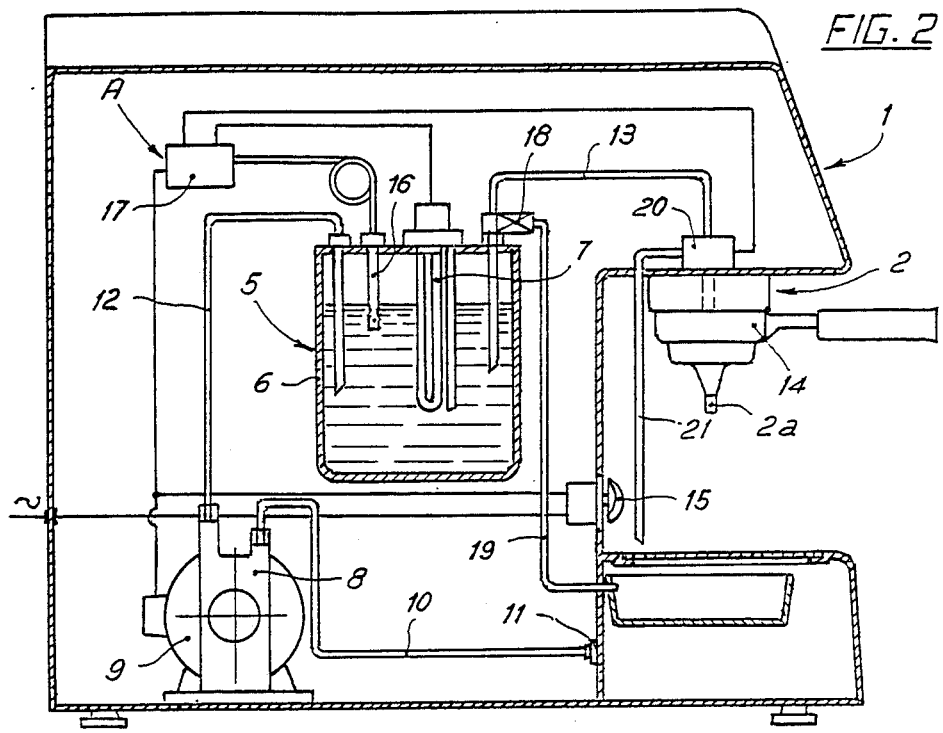
FIGS. 2 and 3 are transversal cross sections on an englarged scale of the machine illustrated in FIG. 1 respectively showing the group for the production of the espresso coffee and the group for the production of hot water and steam for other uses.
Figure 3:
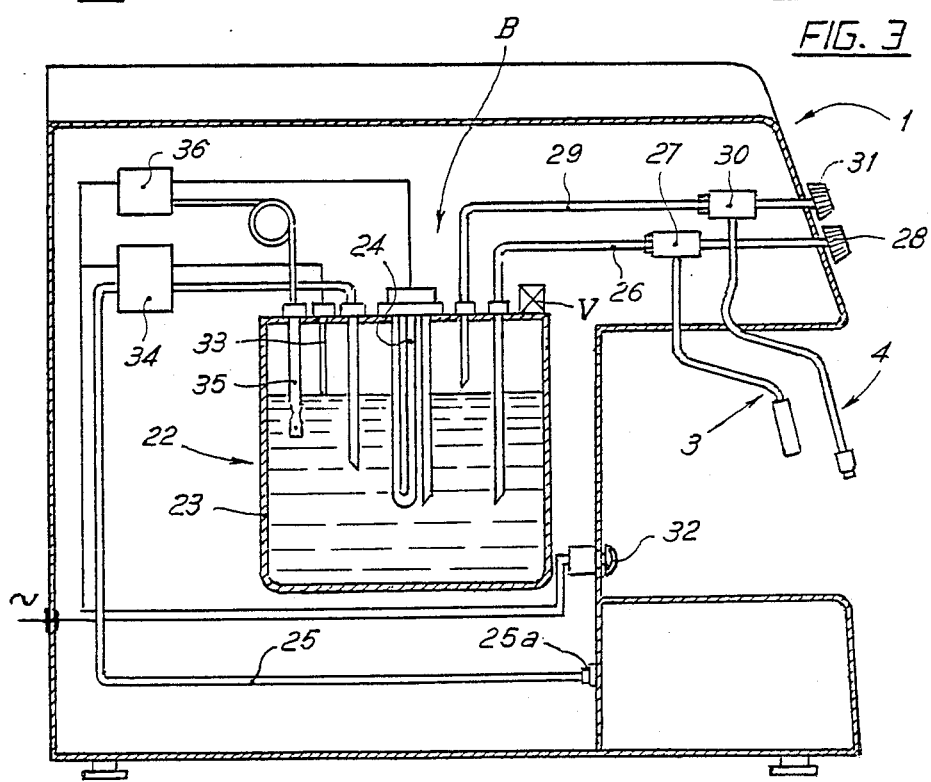

With reference to the example illustrated in FIGS. 1 to 3, integer 1 indicates the assembly of an espresso machine having an espresso coffee dispensing device 2 provided with two coffee spout orifices 2a.

The machine also comprises a tube 3 to dispense hot water and a tube 4 to dispense steam.

In FIG. 2, letter A indicates an autonomous group contained in machine 1 for the production and delivery of the espresso coffee.

Said autonomous group includes a hot water generator provided with a kettle 6 and an electric heating resistance 7.

Hot water generator 5 is fed with cold water by a pump 8, driven by an electric motor 9 and provided with a suction tube 10 with relevant fitting 11 for connection to the water distributing network.

The delivery tube of pump 8 is identified by number 12; this tube penetrates in closed kettle 6; integer 13 identifies a tube which connects the kettle 6 with the espresso coffee dispensing assembly.

Group 2 comprises a filter holder 14 apt to be filled with ground coffee.

Integer 15 identifies a switch to switch on resistance 7 and drive motor 9 of pump 8.

Integer 16 identifies a thermostat which dips in kettle 6 and actuates a switch 17 inserted in the electric supply circuit of resistance 7.

Integer 18 identifies a discharge valve for overpressure of electric generator connected to overpressure discharge tube 19.

Integer 20 identifies a solenoid valve utilized to release the pressure of coffee dispensing assembly 2 by placing it in communication with the atmosphere via discharge tube 21.

In FIG. 3, letter B identifies an autonomous assembly housed in machine 1 adjacent to previously mentioned autonomous assembly A and apt to provide the delivery of hot water and steam.

The assembly B comprises a generator 22 for the hot water and steam including a closed kettle 23 having a capacity greater than that of kettle 6 of assembly A and an electric resistance 24 fitted in said kettle 23.

Integer 25 idicates a tube provided with a related fitting 25a for connection to a water distribution network and apt to feed cold water into kettle 23 which is provided with a safety valve V.

Integer 26 identifies a tube connecting the zone filled by the water in kettle 23 with hot water dispensing tube 3.

A shut off valve 27 is fitted in tube 26, said safety valve being operated by a knob 28.

Integer 29 identifies a tube connecting the steam zone in kettle 23 with steam dispensing tube 4.

A shut off valve 30 actuated by knob 31 is fitted in tube 29.

From the above description it emerges that hot water generator 5 used for the production of the espresso coffee is independent from the hot water and steam generators 22 serving other uses.

Moreover, each one of said generators are part of fully autonomous assembly; as a result of which several machines can be provided each having one or more coffee dispensing groups by virtue of a corresponding number of autonomous assemblies A.

Similarly, by using one or more autonomous groups B in the same machine it is possible to equip this with a corresponding number of hot water and steam dispensing tubes depending on requirements of the machine itself.

Obviously the length of the frame supporting autonomous assemblies A and B will have to be proportional to the number of groups, and this also applies to the chassis enveloping the supporting framework.

The variant shown in FIGS. 4 to 7 differs from the embodiment illustrated in FIGS. 1 to 3 in that each of said autonomous groups A and B is contained in a corresponding modular element of the machine in order to simplify further the production of machines equipped with different numbers of coffee dispensing assemblies.

In FIG. 4, number 1a identifies an "espresso" coffee machine consisting of a modular machine element 37, housing autonomous group A of the type shown in FIG. 2, and a modular element 38 housing an autonomous group B as described with reference to FIG. 3.

As shown in FIG. 5 each one of modular elements 37, 38, comprise a supporting structure 39 for the components of the respective autonomous groups and a body 40 enveloping said supporting structure.

Number 40a identifies the sides of the body each consisting of a panel 40a, provided, on its inside surface with hooks 41 which engage in corresponding apertures 42 in the end elements of supporting structure 39.

The above connection by means of hooks of body sides 40a makes possible disassembly of said sides for connection between supporting structures 39 of two adjacent modular elements 37 and 38.

To provide such connection each one of the end elements of supporting structure 39 of each machine modular element 37,38 is provided with holes 43 for connecting bolts 44.

From the above description it is evident that the modular elements 37,38 make it possible to realize espresso coffee machines provided with one, two, three or four groups 2 for dispensing coffee and a corresponding variable number of tubes 3 for dispensing hot water and tubes 4 for dispensing steam, depending on requirements.

I claim:

1. An espresso machine comprising:
    (a) at least one autonomous group (A) for the production and dispensing of espresso coffee, said group comprising a hot water generator (5) having a closed kettle (6) and heating means (7) associated with said kettle; an electrically driven pump (8, 9) to feed cold water under pressure from a cold water source, to said kettle (6); a coffee dispensing group (2) including a filter holder (14) apt to contain a dose of ground coffee and a tube (13) connecting said kettle (6) with said coffee dispensing group to feed hot water under pressure to said coffee dispensing group (2) when said electrically driven pump (8, 9) is operated; and
    (b) at least one autonomous group (B) dispensing hot water and steam, said group comprising a hot water and steam generator (22) having a closed kettle (23) and heating means (24) associated with said kettle; a supply conduit (25) to feed cold water to said kettle from a water distribution network; a first delivery conduit (26) connecting, through a shut off valve (27) the zone filled by the water in said kettle (23) with a tube (3) to dispense the hot water and a second delivery conduit (28) connecting, via a second shut-off valve (29) the steam zone in said kettle (23) with a steam dispensing tube (14).

2. Machine according to claim 1 characterized in that each one of said autonomous groups (A-B) is housed in a corresponding modular machine element (37-38); said modular elements (37-38) may be interconnected as they are adjacent, so as to provide espresso coffee machines having one or more groups (A) for production and dispensing of espresso coffee and one or more groups (B) for the production and dispensing of hot water and steam.

3. Machine according to claim 2, characterized in that each modular element (37,38) comprises a supporting structure which supports the components of the respective autonomous group (A,B) and a body (40) which envelops said supporting structure; sides (40a) of said body (40) being connected in a manner that permits easy disassembly, from the supporting structure (39) so as to consent inter-connection between said supporting structures (39) of two adjacent machine modules (37,38).

4. Machine according to claim 3, characterized in that each of the two sides (40a) of the body of each modular machine element (37-38) consists of a panel provided on its inside surface with hook shaped projections (41) which engage in corresponding slots (42) in the sidewalls of said supporting structures (39) of the modular element.

5. Machine according to claim 3, characterized in that each one of the sidewalls of supporting structure (39) of each modular element (37,38) is provided with holes (43) to permit connection by means of bolts (44) between supporting structures (39) of two machine modular elements (38,39) adjacent to each other.

* * * * *